(12) United States Patent
Westergaard (10) Patent No.: US 10,093,520 B2
(45) Date of Patent: Oct. 9, 2018

(54) LIFTING DEVICE FOR ROTOR ASSEMBLY AND METHOD THEREOF

(71) Applicant: Envision Energy (Denmark) ApS, Silkeborg (DK)

(72) Inventor: Jan Westergaard, Brande (DK)

(73) Assignee: Envision Energy (Denmark) ApS, Silkeborg (DK)

(*) Notice: Subject to any disclaimer, the term of this patent is extended or adjusted under 35 U.S.C. 154(b) by 0 days.

(21) Appl. No.: 15/318,097

(22) PCT Filed: Jun. 11, 2015

(86) PCT No.: PCT/DK2015/050160
§ 371 (c)(1),
(2) Date: Dec. 12, 2016

(87) PCT Pub. No.: WO2015/188836
PCT Pub. Date: Dec. 17, 2015

(65) Prior Publication Data
US 2017/0121155 A1    May 4, 2017

(30) Foreign Application Priority Data

Jun. 12, 2014 (DK) .............................. 2014 70350
Mar. 11, 2015 (DK) .............................. 2015 70136

(51) Int. Cl.
*B66C 1/10* (2006.01)
*F03D 13/10* (2016.01)
*F03D 1/06* (2006.01)

(52) U.S. Cl.
CPC ............ *B66C 1/108* (2013.01); *F03D 1/0691* (2013.01); *F03D 13/10* (2016.05); *F05B 2230/61* (2013.01)

(58) Field of Classification Search
CPC .......... B66C 1/105; B66C 1/108; B66C 1/42; B66C 1/425; B66C 1/62; B66C 13/08; F03D 13/10; F03D 1/0691; F05B 2230/61
(Continued)

(56) References Cited

U.S. PATENT DOCUMENTS 2,821,318 A * 1/1958 Kendall ................ B21C 47/242
294/197
2,913,276 A * 11/1959 Collings ................. H01F 7/206
294/65.5
(Continued)

FOREIGN PATENT DOCUMENTS

DE         8418183 U1   10/1984
DE    102010043199 A1    5/2012
(Continued)

*Primary Examiner* — Dean J Kramer
(74) *Attorney, Agent, or Firm* — James Creighton Wrey; Meera P. Narasimhan (57) ABSTRACT

A lifting device and method is provided for lifting and turning a rotor during the erection process of wind turbine structure. The lifting device comprises a base unit with a mounting adapted to be mounted to an outer surface of the hub. The lifting device is able to turn the rotor using a pivotal lifting arm arranged between two end plates or a moveable trolley assembly arranged on a track of the base unit. A power pack unit or another power unit is used to power the turning unit which turns the rotor around a turning point into an installation position. The lifting point is preferably aligned with the center of gravity of the rotor for providing a balanced lift.

11 Claims, 8 Drawing Sheets

(58) Field of Classification Search
USPC ................ 294/67.21, 67.5, 81.3, 81.4, 86.41
See application file for complete search history.

(56) References Cited

U.S. PATENT DOCUMENTS

| | | | | |
|---|---|---|---|---|
| 2,999,716 | A * | 9/1961 | Elberty | B21C 47/242 |
| | | | | 294/119.1 |
| 4,166,647 | A * | 9/1979 | Schmidt | B66C 1/62 |
| | | | | 294/86.41 |
| 4,375,936 | A * | 3/1983 | Dechantsreiter | B66C 1/485 |
| | | | | 212/319 |
| 4,514,135 | A * | 4/1985 | Cade | B66C 1/62 |
| | | | | 294/86.41 |
| 2004/0056493 | A1* | 3/2004 | Vanagan | B66C 1/105 |
| | | | | 294/67.21 |
| 2009/0159549 | A1 | 6/2009 | Trede | |
| 2009/0324380 | A1 | 12/2009 | Pedersen | |
| 2010/0043227 | A1* | 2/2010 | Numajiri | B66C 1/108 |
| | | | | 29/889 |
| 2013/0147218 | A1* | 6/2013 | Steffensen | B66F 11/00 |
| | | | | 294/67.5 |
| 2013/0269188 | A1 | 10/2013 | Falkenberg | |
| 2014/0341742 | A1* | 11/2014 | Knoop | B66C 1/108 |
| | | | | 416/215 |

FOREIGN PATENT DOCUMENTS

| | | | |
|---|---|---|---|
| EP | 2154366 A1 | 2/2010 | |
| GB | 2476329 A | 6/2011 | |

* cited by examiner

Fig. 12

LIFTING DEVICE FOR ROTOR ASSEMBLY AND METHOD THEREOF

This application claims the benefit of Danish Application No. PA 2014 70350 filed Jun. 12, 2014, Danish Application No. PA 2015 70136 filed Mar. 11, 2015 and PCT/DK2015/050160 filed Jun. 11, 2015, International Publication No. WO 2015/188836, which are hereby incorporated by reference in their entirety as if fully set forth herein.

FIELD OF THE INVENTION

The present invention relates to a method for lifting a rotor of a wind turbine, the rotor having a hub with at least two mounting interfaces for mounting at least two wind turbine blades.

The present invention also relates to a lifting device for lifting a rotor of a wind turbine as described above.

BACKGROUND OF THE INVENTION

It is well-known that during the erection of an offshore or onshore wind turbine the tower sections, the nacelle, the rotor hub, and the wind turbine blades are turned and lifted into position by using two crane units. The various parts can be lifted into position individually or be pre-assembled at an installation site, at a loading site or at the deck before being lifted into position. It is known that at least two of the wind turbine blades or hub extenders can be mounted to the rotor hub before lifting the rotor into position. The rotor hub is normally transported to the installation site in a vertical position and then turned into a horizontal position using a second smaller crane unit in order to allow mounting to the nacelle. The larger crane unit is normally secured to the rotor by using lifting brackets mounted to two of the pitch bearings located on the rotor hub. The lifting brackets are removed before the wind turbine blades are mounted.

The rotor hub can instead be placed in a temporary support frame and then rotated into the horizontal position around a rotation axis in the support frame. However, this solution adds to the total installation costs and introduces additional steps in the assembly process.

US 2009/0324380 A1 discloses a lifting device for lifting and turning a rotor hub into position relative to a nacelle. A mounting end of the lifting device is extended into one of the openings for the wind turbine blades and mounted to an interior structural part of the rotor hub, such as the pitch bearing. A crane wire is secured to the free end of a rotatable arm extending out of the opening. A hydraulic actuator is remotely activated during the lifting process to rotate the arm and the rotor hub around a rotation point. A second crane is needed to control the movement of the rotor hub in order to prevent it from turning and potentially damaging the truck bed during the initial phase of the lifting step. Furthermore, this lifting device requires that at least one wind turbine blade is lifted into position and installed afterwards as the lifting device occupies one of the openings.

US 2013/0269188 A1 discloses a similar lifting device where a mounting end is extended into one of the openings and mounted to an inner surface of the respective pitch bearing. A crane wire is secured to the other end of the lifting device and a temporary pitch control unit is connected to the pitching mechanism of the rotor hub via electrical cables or hydraulic hoses. The rotor hub is then lifted out of its support frame and the pitching mechanism of the rotor hub is activated to rotate the rotor hub around the centre line of that pitch bearing. The pitch control unit is then disconnected and the rotor hub is lifted into position relative to the nacelle. The lifting device takes up one of the openings which means that one wind turbine blade has to be mounted afterwards. Secondly, the use of a separate pitch control unit adds to the costs of the lifting device and requires a worker to manually connect and disconnect the pitch control unit each time the lifting device is used.

US 2009/0159549 A1 discloses a lifting device mounted to the outer surface of the rotor hub. In one embodiment, the lifting device has a mounting frame to which an actuator and a very large and heavy lifting arm are pivotal connected. The crane wire is connected to connection means at the opposite end of the lifting arm. Both the lifting arm and the actuator extend outwards from the frame, even in the compact state, meaning that these elements and their connection points are subjected to considerable transverse moments during the lift. In another embodiment, the lifting device has a curve track on which a trolley assembly is located. The crane wire is connected to the trolley and a gear inside the trolley is used to rotate the rollers which move the trolley along the track. The trolley can only be positioned at the end positions as no braking mechanism is provided.

OBJECT OF THE INVENTION

An object of this invention is to provide a lifting device that eliminates the need for two cranes during the lifting process.

An object of this invention is to provide a lifting device capable of lifting a rotor with all the wind turbine blades mounted to the rotor hub.

An object of this invention is to provide a method for lifting a rotor that reduces the total assembly time.

DESCRIPTION OF THE INVENTION

In the description below the general term "rotor" refers to the rotor hub with wind turbine blades. The term "hub" refers to the rotor hub without the wind turbine blades.

An object of the invention is achieved by a method for lifting a rotor of a wind turbine, the rotor having a hub with at least two mounting interfaces for mounting at least two wind turbine blades, where the method comprises the steps of:
- mounting at least a part of a wind turbine blade to each of the respective mounting interfaces provided in a hub of a rotor;
- mounting a lifting device as described below to an outer surface of the hub;
- connecting an external lifting unit to a turning unit of the lifting device and lifting the rotor into a first suspended position;
- turning the rotor in an angle of substantially 90 degrees from its lifting position into an installation position by moving a trolley assembly along a track located on a base unit of the turning unit; and further
- lifting the rotor into a second suspended position relative to a mounting interface of a nacelle of a wind turbine, characterised in that the turning unit comprises a braking mechanism configured to stop the rotor in any intermediate position between the lifting position and the installation position.

This provides a simple and easy method of lifting and turning at least the hub from a transport position to an installation position during erection of the wind turbine structure. This method enables a base unit of the lifting device to be mounted to mounting means, e.g. brackets, located on the outer surface of the rotor hub instead of occupying one of the blade openings formed in the outer surface. Alternatively or additionally, the lifting device may be mounted to a mounting interface for a nose cone or to the periphery of another opening, e.g. a manhole opening, located on the outer surface. This allows for a simpler and easier connection of the lifting device as the worker is able to secure the lifting device from the exterior of the rotor hub. This reduces the total assembly time when installing the rotor assembly.

The hub can be transported to the installation site in an upright or vertical position where the mounting interface for the nacelle or main shaft is resting on a truck bed or a deck of a vessel. The hub may instead be resting on any one of the mounting interfaces for the wind turbine blades during transport. Alternatively, the rotor hub may be arranged in a transport frame which is secured to the truck bed or deck. The lifting device may be mounted to the hub before or after the step of transport.

After the hub is installed, e.g. mounted to the nacelle or the main shaft thereof, the lifting device can be demounted and positioned on another hub or rotor. Finally, a nose cone, a cover and/or an outer housing may be connected to the hub for protecting the hub against the environment and accelerating the wind flowing over the hub. The cover/housing may be connected to the hub prior to the lifting of the rotor where a part of the cover/housing may be omitted for allowing mounting of the lifting device. Alternatively, the lifting device may be arranged along an outer surface of the cover/housing and extended through an opening in the cover/housing for allowing mounting to the rotor hub. In this arrangement, an intermediate mounting element or spacer may be mounted between the lifting device and the cover/housing for compensating for the space between the cover/housing and the outer surface of the hub.

The pitch mechanisms, pitch position transducers/sensors and other electronic/hydraulic components normally located in the hub may be pre-assembled and installed in the hub prior to lifting the hub into position. This reduces the total assembly time.

The lifting device allows all of the wind turbine blades to be mounted to the hub prior to lifting the rotor into position. At least two wind turbine blades or hub extenders/inner blade sections of partial pitchable wind turbine blades are mounted to the hub. The rotor may be fully or partly assembled before lifting it into position this allows for a safer and easier assembly process compared to the rotor being assembled while being suspended from the nacelle. By assembling the rotor in a horizontal position, the wind turbine blade or parts thereof can be handled while still being in their horizontal position, thus allowing for a simpler and easier handling process. This also eliminates the additional steps of lifting the wind turbine blades into position after having installed the hub, and thus reducing the total assembly time.

The pitch mechanisms, pitch position transducers/sensors, flap control system and other electronic/hydraulic components normally located in the wind turbine blade or hub may be pre-assembled and installed prior to the lifting of the rotor into position. This further reduces the total installation time.

The rotor is turned by moving a trolley assembly along a track provided on the base unit between two end positions. The trolley assembly is secured to the crane unit in a lifting point and may be moved by using an on-board drive train acting as an actuator unit. The track preferably has an overall curved or convex shape with a predetermined radius which defines a turning point. In this configuration, the drive train may comprise a gear coupling having a pinion gear engaging a matching gear rim located on the track wherein the pinion gear is connected to a motor driven by a power unit, e.g. a power pack unit, and rotated in a clockwise or counter-clockwise direction as described below. This allows the rotor or hub to be turned without using any pivotal elements and enables the trolley assembly to be stopped at any position between the two end positions. This configuration also allows the rotor to be turned using a minimal amount of force. The use of a moveable trolley reduces the risk of the lifting device failing compared to other types of lifting devices.

According to one embodiment, the lifting device locks the rotor in its current position when activation of the control unit is stopped and unlocks the rotor when the control unit is activated.

The rotor is stopped in any position along the track by applying a braking force to the trolley, e.g. the gear coupling. The braking mechanism, or a separate locking mechanism, may further lock the position of the rotor when no activation of the control unit is detected. If activation of the control unit is detected, then the braking/locking mechanism is unlocked and the trolley is moved along the track. Activation of the control unit may be detected as power ON, transmittal of a control signal to the lifting device, or a separate activation signal. This further increases safety as the rotor is locked once the operator no longer activates the control lever or control knob. The control unit may be a remote control unit for controlling the lifting device remotely.

In an alternative embodiment, the rotor is turned by pivoting a lifting arm connected to the crane unit around a pivot point using an actuator unit located in the lifting device.

This configuration allows the rotor to be turned into an installation or substantial horizontal position around a turning point by means of the lifting device without using a temporary support frame. The rotor is turned into an installation position where the longitudinal direction of the hub is at least parallel to the longitudinal direction of the nacelle or main shaft. Preferably, the hub is further oriented so that the mounting interface faces the matching mounting interface located on the nacelle or main shaft. This further eliminates the need for a second crane unit to turn the rotor or for the workers to hold/guide the rotor during the turning step.

Upon activation, the actuator unit pivots an arm connected to the crane wire around a pivot point located in the base unit which in turn causes the rotor to turn towards the installation position. This allows the rotor to be turned without having to activate the pitch bearing of the hub. The actuator unit may be powered by a power pack unit which may be controlled remotely via wired or wireless connection. The pivot point defines a turning point.

According to another embodiment, the step of lifting the rotor into the first suspended position comprises balancing the rotor during the lift.

During the initial lifting phase, the lifting device and rotor are preferably balanced so that the rotor is substantially lifted in a vertical direction without rotating. This may be done by aligning the lifting point of the arm with the centre of gravity of the rotor. If the lifting point and the centre of gravity are offset, balancing may be done by adjusting the mass of the lifting device and/or by adding weight elements to the lifting device and/or rotor. Other known solutions may be used to balance the rotor during the lift. This eliminates the need for two crane units in order to control the movement of the rotor during the lift.

After the hub or rotor is installed, the lifting device is demounted and the pivotal arm or trolley assembly is moved back into its lifting position.

An object of the invention is also achieved by a lifting device for lifting a rotor of a wind turbine as described above, where the lifting device comprises:

- at least one base unit having one or more mounting means configured for mounting to matching mounting means located on an outer surface of a hub of the rotor, the hub further having at least two mounting interfaces configured for mounting to at least two wind turbine blades;
- at least one turning unit comprising a trolley assembly configured to move along a track located on the base unit, wherein a gear coupling is arranged on the trolley assembly and configured to move the trolley assembly along the track so that the rotor is turned in an angle of substantially 90 degrees from a lifting position into an installation position;
- at least one lifting element located on the trolley assembly configured to be connected to an external lifting unit;
- a control unit configured to control the operation of the lifting device, characterised in that the turning unit comprises a braking mechanism configured to stop the rotor in any intermediate position between the lifting position and the installation position.

This provides a lifting device capable of lifting the hub separately or the rotor with the wind turbine blades mounted to their respective mounting interfaces of the hub. The base unit is configured to extend in a longitudinal direction along the outer surface of the hub. The longitudinal direction extends from a first end facing the mounting interface for the nacelle/main shaft to a second end facing the front end of the hub. The mounting means are configured to be mounted to matching mounting means provided on the outer surface. The lifting device may comprise another set of mounting means configured to be mounted to a mounting interface for a nose cone or other mounting means located on the outer surface, e.g. at the periphery of a manhole opening. This enables the lifting device to be positioned between two adjacent mounting interfaces instead of blocking one of the blade openings thus allowing for a simpler and easier connection to the rotor since it can be mounted from the outside of the hub.

The mounting means may be matching mounting flanges or brackets, female and male mounting elements, or a mechanical or hydraulic locking mechanism, e.g. a quick coupling, operated by another actuator unit or power unit. This allows for a simpler and easier mounting using fastening elements; such as bolts, screws or the like, or suitable coupling mechanism. The mounting means may also be used for handling the hub during manufacturing, thus allowing the lifting device to be mounted to existing hubs or rotor assemblies.

In this configuration, the rotor or hub is turned by means of a trolley assembly configured to move along a track provided on the base unit. The trolley, the track, and/or base unit may be made of any suitable material, such as steel. The trolley is supported during the turning process by moveable elements located at one leg of the trolley, preferably on both legs of trolley. The lifting element, e.g. an eye, a hook or an axle, may be arranged on the top end of the trolley and define a lifting point. A pinion gear may be rotatably connected to a motor which in turn is driven by a power unit, e.g. a fuel or gas powered generator. The motor and/or power unit may be replaced by an electrical power pack unit. The control unit may be used to control the operation of the trolley assembly. The gear and gear rim enables the trolley assembly to be stopped at any intermediate position between the two end positions.

A safety mechanism may be incorporated in the trolley assembly for disengaging the gear coupling in the event of a failure. The drive train or pinion gear may be slidably connected to the trolley, e.g. via a slidable seat or clutch gear, for sliding the drive train or pinion gear out of engaging with the gear rim. The seat/clutch may be configured to slide in a radial or axial direction relative to the pinion gear. This allows for a manual turning of the rotor or hub in the event of a failure. The trolley assembly further comprises a braking mechanism arranged relative to the track or the gear coupling. The braking mechanism is configured to apply a braking force to stop the trolley in any intermediate or end position. The braking mechanism may also act as a locking mechanism for locking the rotor in that position during the turning and lifting process. Alternatively a separate locking mechanism may be used to lock the rotor. The braking mechanism may be an electrical, hydraulic, pneumatic, or electromagnetic brake.

In an alternative embodiment, the turning unit comprises a pivotal arm connected to the base unit at a pivot point, the arm is further connected to an actuator unit configured to pivot the arm relative to the base unit.

In this configuration the rotor or hub can be turned by means of a pivotal lifting arm connected to the crane unit. The arm is able to move or pivot between a retracted position and an extended position by activation of the actuator unit. The actuator unit is connected to the arm between the pivot point and the lifting point, e.g. via a rotatable joint. The actuator unit may be a hydraulic, pneumatic or electrical operated linear actuator. This allows for a simple and easy turning of the rotor without having to use a second crane unit or guide wires operated by worker at the ground.

In a further alternative embodiment, the base unit comprises two end plates interconnected by any number of spacer elements, wherein at least the arm is arranged between the support plates.

This configuration allows the pivotable lifting arm to be supported or guided during the pivotal movement. The base unit, e.g. the end plates, and the arm may be made of any suitable material, such as steel or another high strength material. The actuator unit may further be arranged between the support plates. The actuator unit and lifting arm may be connected to the end plates at opposite ends allowing the two units to be more or less concealed by end plates when being in the retracted position. This prevents the arm from moving in a transverse direction due to movement of the rotor which could lead to a failure in the arm or in the pivot joint. The lifting arm of US 2009/0159549 A1 is not sandwiched between two solid end plates, instead it is positioned on the side of a frame structure. This means that the lifting arm is not symmetrically arranged in the lifting device, thus the connection point of the lifting arm experiences significantly higher loads that those of the present invention.

According to one embodiment, the lifting device comprises a power unit, e.g. a power pack unit, configured to power the turning unit, the power unit being controlled by the control unit.

This configuration allows the actuator unit to be activated remotely via a wired or wireless connection. The power pack unit may comprise one or more accumulators, each storing an accumulated amount of hydraulic, pneumatic or electrical energy for powering the actuator unit. Alternatively, the power pack unit may comprise a combustion engine for providing power to the actuator unit driven by any type of fuel or gas, such as diesel, gasoline or petroleum. The power pack unit may further comprise pumps, valves or the like to regulate the amount of fluid being supplied to or from the actuator unit.

According to one embodiment, the power unit is connected to the base unit via a rotatable coupling, wherein the coupling is configured to maintain the power unit in substantially the same orientation during the rotation of the rotor.

This configuration allows the power pack unit to remain in a correct position so that it can be operated at all times. Placing the power pack unit in an incorrect position may cause the power pack unit to be inoperable, particularly if a combustion engine is used. This may be done by placing the power pack unit on a pendulum element suspended from the base unit or another part of the lifting device. Alternatively the power pack unit may be placed on a moveable, e.g. slidable or rotatable, element configured to move, e.g. slide or rotate, relative to the base unit. One or more guiding tracks or grooves may be arranged on an outer surface of the base unit and on the moveable element.

According to one embodiment, the track has one or more track sections, wherein the shape of the one or more track section is selected from: an involute, a circle, a straight line, a parabola, or an ellipse.

The T-shaped track may be formed by a single track section or multiple track sections each having a predetermined profile in the longitudinal direction of the track. The track sections may each form a straight line segment or a curved line segment, e.g. an involute, a circular, a parabolic, an elliptical or another suitable line segment. This allows the track or track sections to be formed so that a minimum amount of force is required to move the trolley along the track in either direction.

According to a special embodiment, a gear rim is arranged symmetrically on the track, wherein the power unit is configured to drive a motor connected to a pinion gear engaging the gear rim.

The gear rim is symmetrically arranged in a central plane of the lifting device, e.g. on the outer surface of the track, thus allowing the trolley to be moved even if the trolley is angularly displaced relative to the track by about 2 degrees. Unlike the solution of US 2009/0159549 A1 wherein the gear rim is arranged on the side of a plate-like element, the drive gear engages the gear rim, and a roller contacting the inner side of the gear rim adds support to the drive unit.

The track may further comprise one or more projecting guide racks or guide grooves used to guide the trolley along the track. One or more sets of moveable elements, e.g. rollers, bearings or wheels, may be arranged on the trolley for contacting the guide racks or guide grooves. Preferably, at least a first and a second pair of moveable elements are arranged on one side of the tracks for contacting at least a matching first and a second pair of guide tracks or guide grooves. Alternatively, the guide tracks or guide grooves may be omitted so that the sets of moveable elements directly contact the opposite surfaces of the track. The moveable elements provide at least a first and a second set of moveable elements, and optional matching guide tracks/grooves may be provided on opposite sides of the track for additional support in the transverse direction. The trolley has two legs wherein the track is located between the two legs on which the moveable elements are located.

According to one embodiment, the control unit is connected to the lifting device via a wireless connection, wherein the control unit is configured to remotely control the operation of the lifting device.

This configuration enables a single worker to remotely control the rotation of the rotor, e.g. from the nacelle, which allows for a safer lifting process. In this embodiment, no power cables or hydraulic/pneumatic hoses are needed to control the lifting device or rotating the rotor. The control unit is configured to control the operation of the lifting device via a wireless or wired connection. The wireless connection may be an infrared or laser connection, a Bluetooth® connection, a radio-frequency (RF) connection, or any other suitable connection. This allows for a simple and easy control of the lifting device.

According to one embodiment, the lifting element is aligned with a centre of gravity of the rotor and/or the lifting device comprises means for adjusting the balance between the lifting device and the rotor.

In this configuration, the lifting device and rotor/hub are balanced so that they are lifted upwards in a substantially vertical direction without causing a rotation of the rotor/hub. This may be done by placing the pivotal arm in the retracted position or the trolley assembly in a lifting position wherein the lifting element is aligned with the centre of gravity of the rotor or hub. The mass of the lifting device may also be used to balance the structure, optionally one or more weight elements may be added to the lifting device and/or the rotor or hub for adjusting the balance. The trolley assembly may be balanced by placing the motor and power unit on opposite sides of the track, if needed, one or more optional weight elements may be added to the motor and/or the power unit to further balance the trolley.

An object of the invention is further achieved by a rotor comprising at least a hub having at least two mounting interfaces configured for mounting to at least two wind turbine blades, characterised in that the hub comprises one or more mounting means configured to be mounted to a lifting device as described above, wherein the mounting means are arranged on an outer surface of the hub.

This configuration allows new hubs to be outfitted with one or more mounting means dedicated for attachment of the lifting device. Other mounting means dedicated for other applications may be provided on the outer surface. Existing hubs may be retrofitted with mounting means for the lifting device.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

REFERENCE LIST

1 Wind turbine
2 Wind turbine tower
3 Foundation
4 Nacelle
5 Rotor
6 Hub
7 Wind turbine blades
8 Lifting device
9 Truck
10 Outer surface
11 First mounting interface
12 Second mounting interfaces
13 Third mounting interface
14 First mounting means
15 Second mounting means
16 Lifting arm
17 Actuator unit
18 Base unit
19 Pivot point
20 Lifting element
21 Power unit
22 Turning direction
23 Cover
24 Opening
25 Trolley assembly
26 Frame structure
27 First contact surface
28 Second contact surface
29 Moveable elements
30 Motor
31 Power unit
32 Pinion gear
33 Gear rim
34 Hole, safety mechanism
35 Braking mechanism
36 Lifting strap

DETAILED DESCRIPTION OF THE INVENTION

Figure 1:
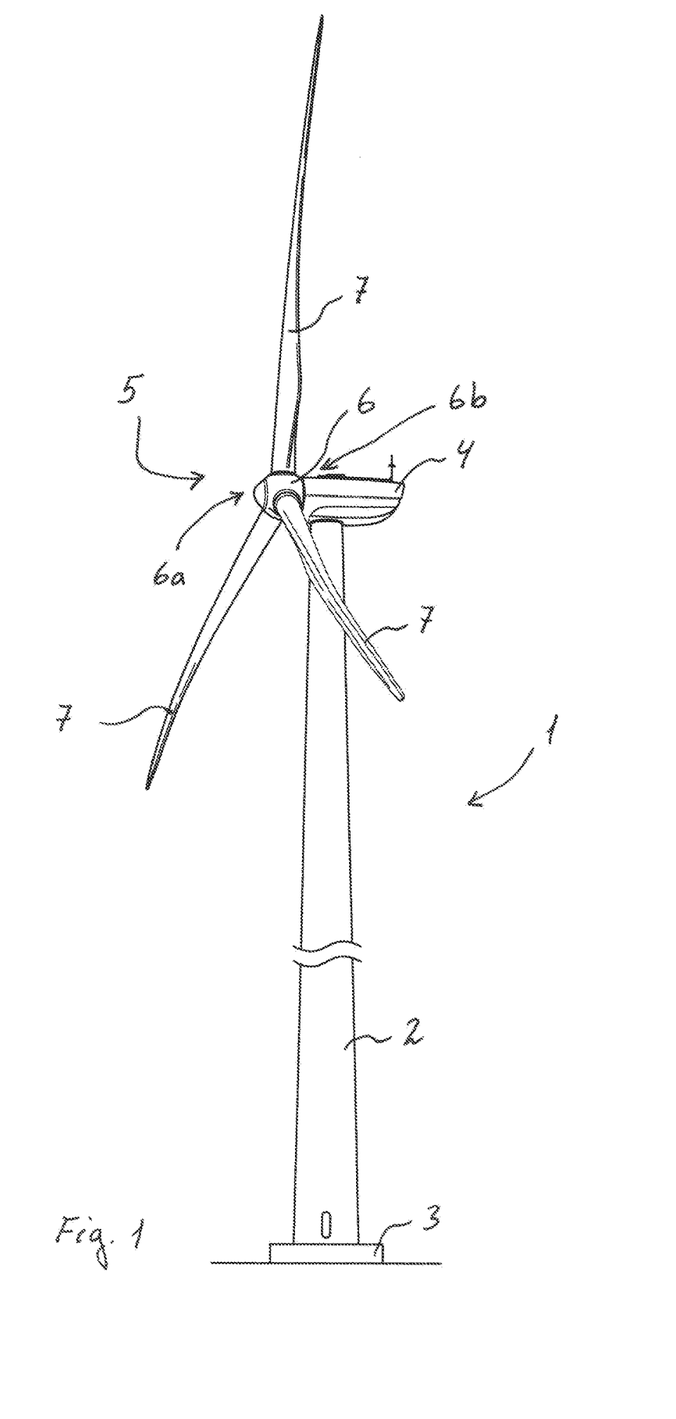
FIG. 1 shows an exemplary embodiment of a wind turbine with a rotor assembly.

FIG. 1 shows an exemplary embodiment of a wind turbine 1 with a rotor assembly. The wind turbine 1 comprises a wind turbine tower 2 having a bottom end mounted to a foundation 3 which may be an onshore foundation as well as an offshore foundation. A nacelle 4 is rotatably connected to a top end of the wind turbine tower 2, e.g. via a yaw bearing connected to a control system (not shown). A rotor 5 is rotatably connected to the nacelle 4, e.g. via a main shaft (not shown). The rotor 5 comprises a hub 6 to which at least two, e.g. three, wind turbine blades 7 are mounted. Each wind turbine blade comprises a tip end and a blade root. The hub 6 comprises a front end 6a facing away from the nacelle 4 and a back end facing the nacelle 4. The wind turbine blades 7 may be traditional full-span pitchable blades as shown in FIG. 1 or partial pitchable blades (not shown) having an inner blade section and outer blade section. A pitch bearing (not shown) is arranged between the hub 6 and wind turbine blade 7 or between the inner and outer blade sections of the wind turbine blade 7.

Figure 2:
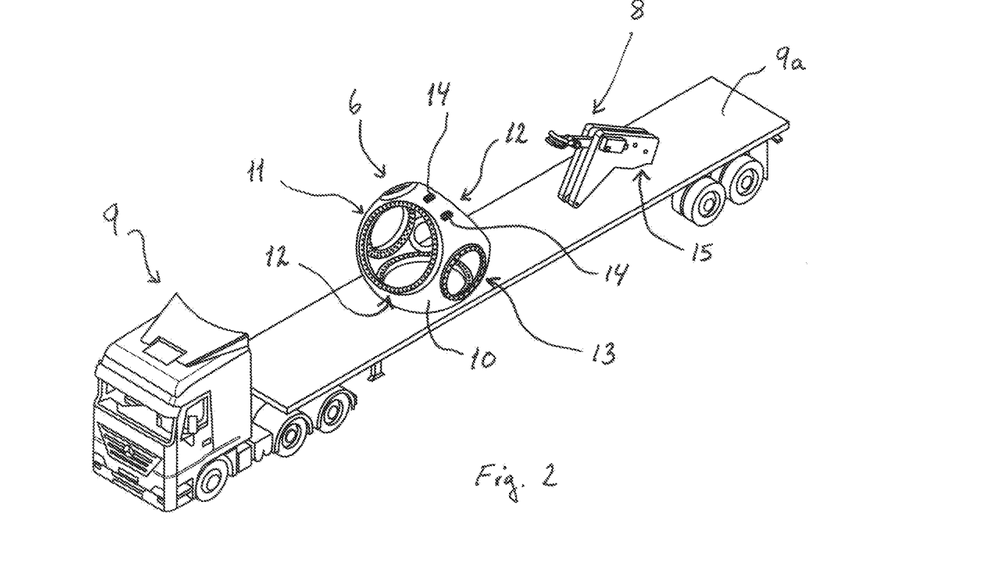
FIG. 2 shows a first step of a first lifting method according to the invention.
Figure 3:
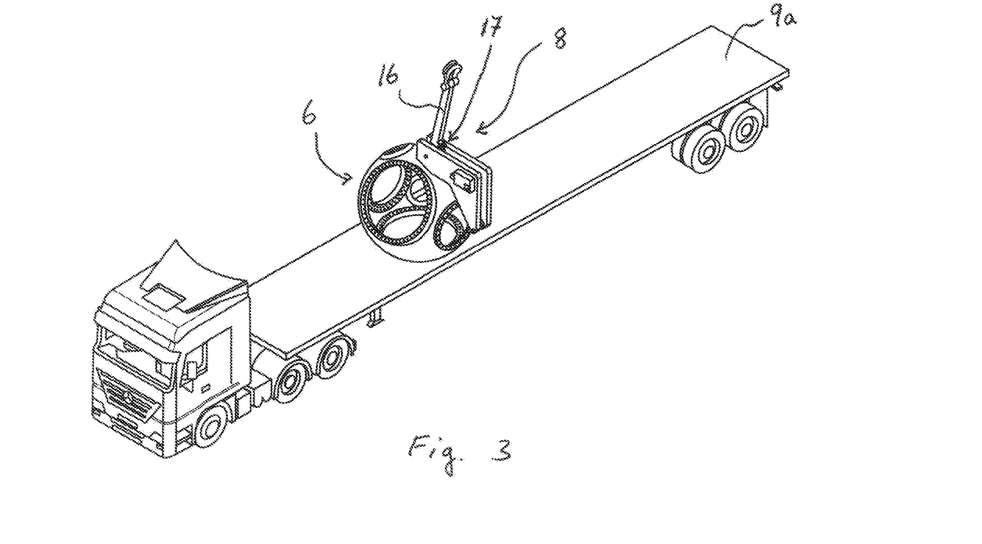
FIG. 3 shows a second step of the first lifting method.
Figure 4:
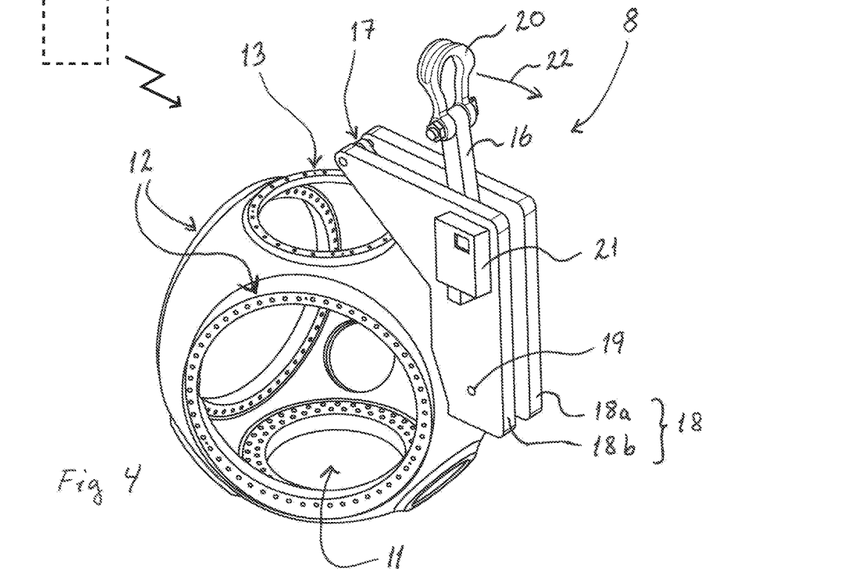
FIG. 4 shows an alternative second step of the first lifting method.

FIGS. 2-4 show a lifting method for installing the rotor 5 to the nacelle 4 by using a first embodiment of a lifting device 8 according the invention. The hub 6 and the wind turbine blades 7 are transported to the installation site on separate trucks 9. The lifting device 8 and/or other components of the rotor 5 are transported to the installation site separately or together with the hub 6 as shown in FIG. 2.

The hub 6 comprises a main support frame having an outer surface 10 in which a first mounting interface 11 for mounting to the nacelle 4 or a main shaft is arranged. The hub 6 further comprises at least two second mounting interfaces 12, e.g. three, for mounting to the wind turbine blades 7 arranged in the outer surface 10. The hub 6 comprises a third mounting interface 13 for mounting to a nose cone (not shown). The hub 6 is transported to the installation site in a transport position where one of the mounting interfaces 11, 12 is facing the truck bed 9a.

One or more first mounting means 14, e.g. mounting brackets, are arranged on the outer surface 10 for mounting to the lifting device 8. The lifting device 8 comprises matching second mounting means 15, e.g. brackets or mounting surface, for mounting to the hub 6.

FIG. 3 shows a second step of the lifting method where the lifting device 8 is mounted to the hub 6. The lifting device 8 comprises a pivotable arm 16, e.g. a lifting arm, configured to pivot around a pivot point (not shown in FIG. 3) between a retracted position and an expanded position. The arm 16 is connected to an actuator unit 17, e.g. a linear actuator, configured to move the arm 16 when activated. The lifting device 8 is mounted to the hub 6 before or after the step of transportation.

If the hub 6 is transported to the installation site with one of the second mounting interfaces 12 facing the truck bed 9a as shown in FIG. 3, the arm 16 is pivoted into the expanded position before or after mounting the lifting device 8 to the hub 6. In this configuration, the hub 6 can be lifted directly into a suspended position relative to the nacelle 4 by using a crane unit (not shown) without being turned. The first mounting interface 11 is then mounted to the matching mounting interface (not shown) of the nacelle 4. This allows the hub 6 to be installed separately without the wind turbine blades 7.

FIG. 4 shows an alternative second step of the first lifting method where the hub 6 is transported to the installation site with the first mounting interface 11 facing the truck bed 9a. The truck 9 and truck bed 9a is omitted from FIG. 4 for illustrative purposes. In this configuration, the arm 16 is placed in the retracted position.

The lifting device 8 comprises a base unit 18 comprising two end plates 18a, 18b spaced apart by using one or more spacer elements (not shown). The arm 16 is arranged between the end plates 18a, 18b and is at one end connected to the pivot point 19. The arm 16 comprises at the other end a lifting element 20 in form of a lifting eye for connection to a crane wire. The actuator unit 17 is connected to a power unit 21 in the form of a power pack unit configured to power the operation of the actuator unit 17. The power unit 21 comprises a communications module, e.g. a wireless communications module, for communicating with a remote control unit (indicated by dotted lines). The control unit is configured to control the operation of the lifting device.

A crane wire is connected to the lifting element 20, and the hub 6 is lifted into a first suspended position. The actuator unit 17 is then activated via the control unit, and the arm 16 is pivoted from the retracted position (shown in FIG. 4) towards the expanded position (shown in FIG. 3). This causes the hub 6 to turn (marked with arrow 22) from the transport position and into an installation position. After the step of turning is complete, the hub 6 is lifted further into a suspended position relative to the nacelle 4. Alternatively, the turning and lifting may be done in a single step. The first mounting interface 11 is then mounted to the matching mounting interface (not shown) of the nacelle 4. This allows the hub 6 to be turned by using a single crane unit.

Figure 5:
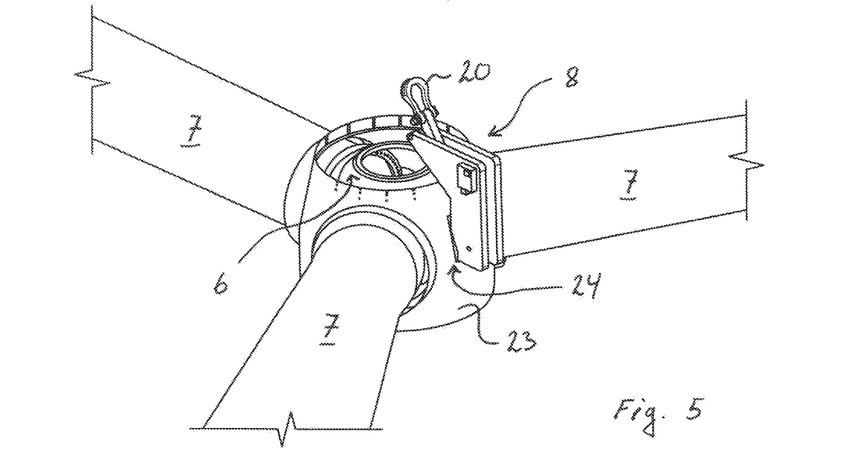
FIG. 5 shows a first step of a second lifting method according the invention.

FIG. 5 shows a first step of a second lifting method according the invention where the rotor 5 is pre-assembled prior to the lifting of the rotor 5. In this configuration, the hub 6 is placed in a substantial horizontal position at the installation site, and wind turbine blades 7 are then mounted to the hub 6. A cover 23 is further mounted to the outer surface 10 of the hub 6. The lifting device 8 is then mounted to the hub 6 through an opening 24 in the cover 23.

The lifting point defined by the lifting element 20 is preferably aligned with the centre of gravity of the rotor 5 so that the structure is balanced during the lift. The mass and weight of the lifting device 8 is used to balance the lift.

Figure 6:
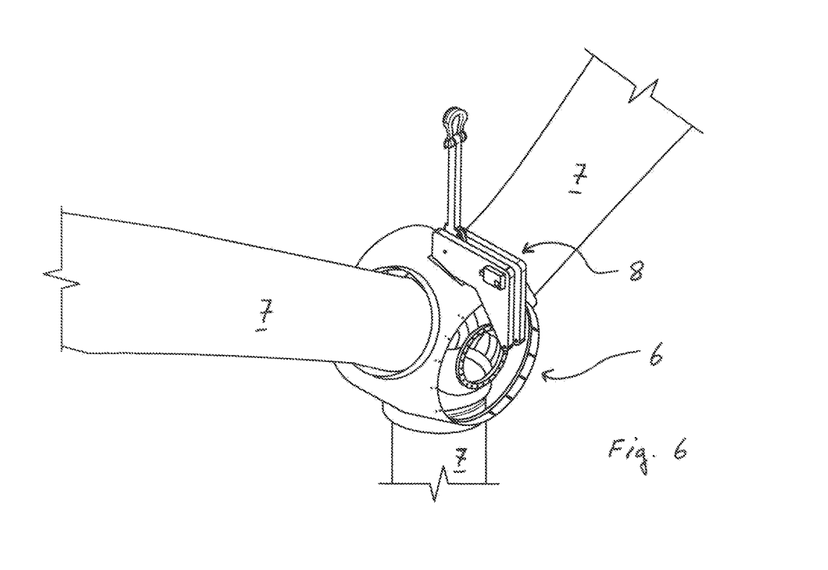
FIG. 6 shows a second step of the second lifting method.

FIG. 6 shows a second step of the second lifting method where the rotor 5 is lifted to the first suspended position. The lifting device 8 is then activated, and the arm 16 is pivoted from the retracted position shown in FIG. 5 to the expanded position shown in FIG. 6. The rotor 5 is thereby turned 22 into the installation position.

Figure 7:
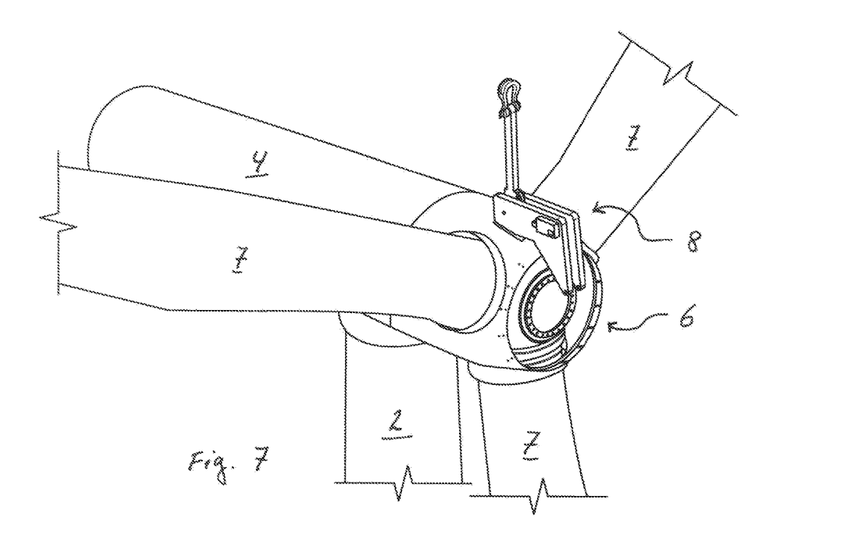
FIG. 7 shows a third step of the second lifting method.

FIG. 7 shows a third step of the second lifting method where the rotor 5 is lifted into position relative to the nacelle 4. The first mounting interface 11 is then mounted to the matching mounting interface on the nacelle 4.

The lifting device 8 is finally demounted from the hub 6 and the remaining parts of the cover 23 are mounted to the other parts of the cover 23 or the hub 6. In this step a nose cone (not shown) is mounted to the third mounting interface 13.

Figure 8:
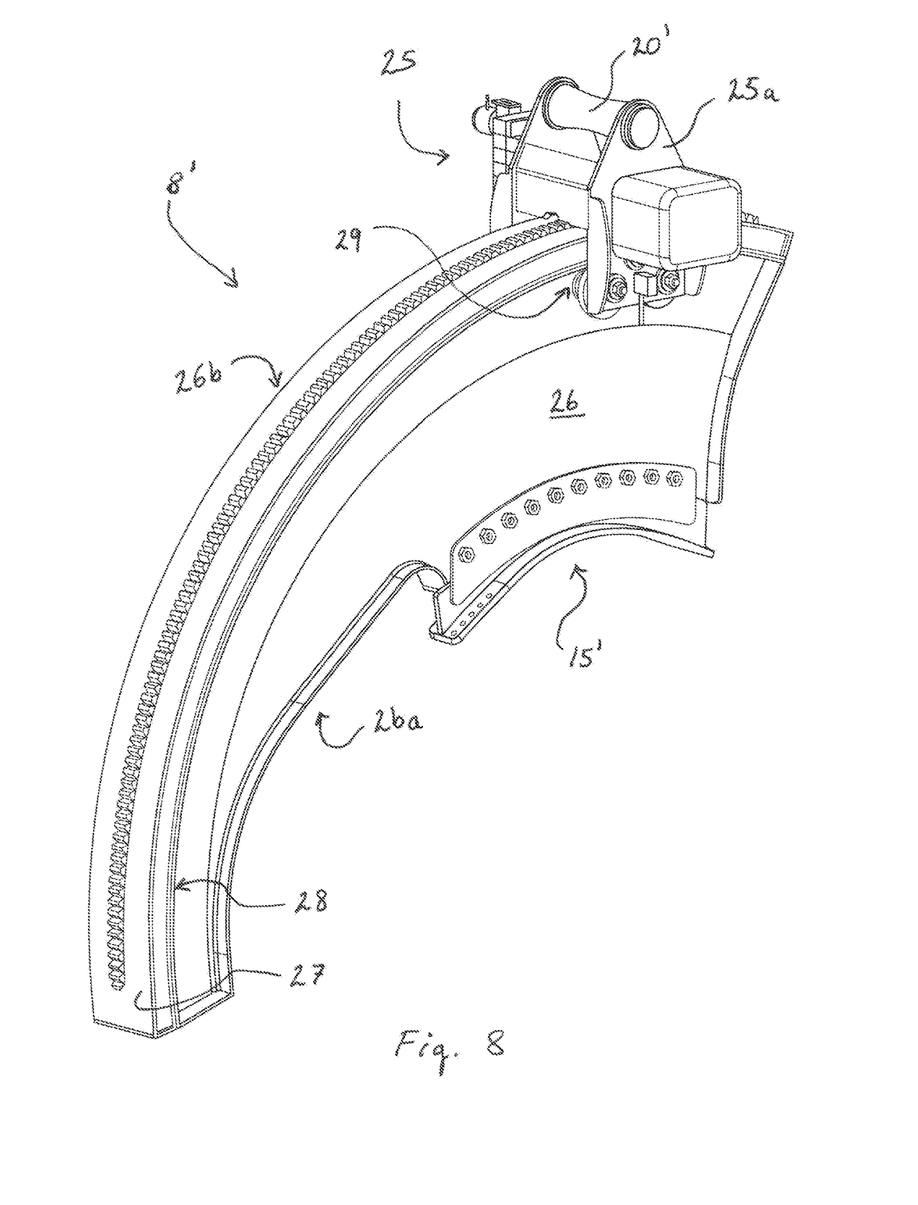
FIG. 8 shows a second exemplary embodiment of the lifting device.

FIG. 8 shows a second exemplary embodiment of the lifting device 8' wherein the pivotal arm 16 is replaced by a trolley assembly 25. In this configuration the base unit 18' is shaped as a frame structure 26 having a bottom end 26a facing the outer surface 10 of the hub 6 and a top end 26b facing away from the hub 6. The mounting means 15' is configured as a mounting bracket arranged at the bottom end. The contact surface of the mounting bracket is shaped to follow the curvature of the outer surface 10, e.g. the first mounting means 14. Alternatively, an adaptor element (not shown) is mounted between the second mounting means 15' and the first mounting means 14.

The top end 26b has a T-shaped track with a first contact surface 27 facing the top end 26b and a second contact surface 28 facing the bottom end 26a. The trolley 25a has two legs extending towards the bottom end 26a. Each leg comprises a first set of moveable elements 29 (shown in FIG. 9) for contacting the first contact surface 27 and a second set of moveable elements 29 (shown in FIG. 10) for contacting the second contact surface 28. The moveable elements 29 are support rollers configured to move the trolley 25a along the track. The first and second sets of moveable elements 29 are aligned over each other to two pairs of rollers located on either side of the track.

A lifting element 20' in the form of a lifting axle is arranged at the trolley 25a for connection to a crane wire.

Figure 9:
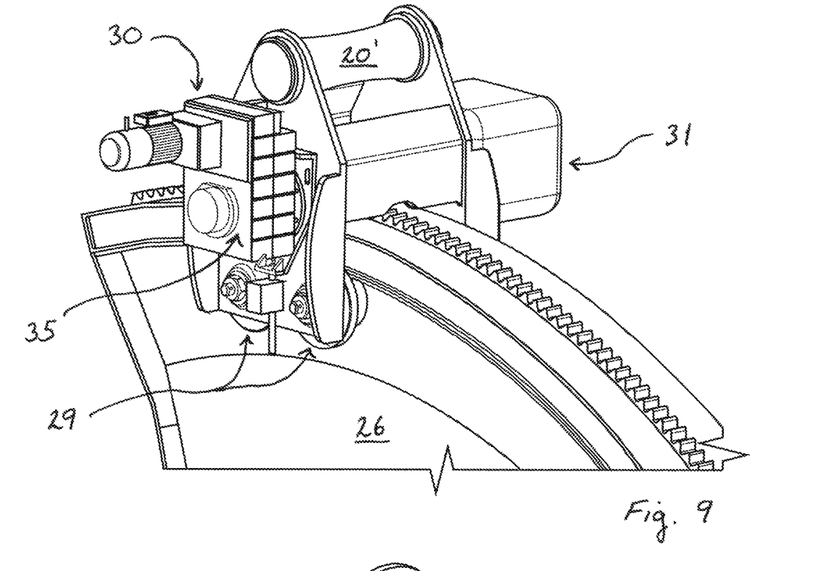
FIG. 9 shows the trolley assembly of FIG. 8 seen from the motor side.
Figure 10:
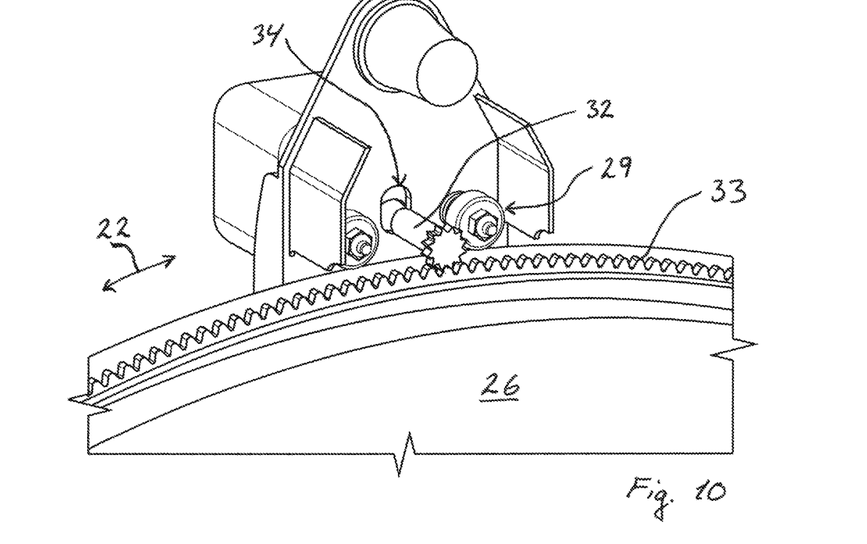
FIG. 10 shows the trolley assembly of FIG. 8 seen from the motor side.

FIGS. 9-10 show a drive train of the trolley assembly 25 where FIG. 9 shows the drive train from a motor side and FIG. 10 shows a gear coupling from the motor side. The drive train comprises a motor 30, e.g. a gear motor, driven by a power unit 31, e.g. a generator. The motor 30 (only shown in FIG. 9) is rotatably connected to the gear coupling comprising a drivable pinion gear 32 engaging a matching gear rim 33 extending along the track. The pinion gear 32 and gear rim 33 are used to move the trolley assembly 25 and thereby turn 22 the rotor 5.

A safety mechanism is connected to at least the pinion gear 32 and configured to disengage the pinion gear 32 from the gear rim 33 in the event of a failure. The safety mechanism is in FIG. 10 indicated by an elongated hole 34 through which the drive axle extends. A braking mechanism 35 (shown in FIG. 9) is further arranged relative to the drive train for applying a braking force to the trolley assembly 25. The braking mechanism 35 locks the trolley and thus the rotor 5 in any position along the track when activated. The braking mechanism 35 is released when the control unit is activated, e.g. by turning power ON or activating a control lever or knob.

Figure 11:
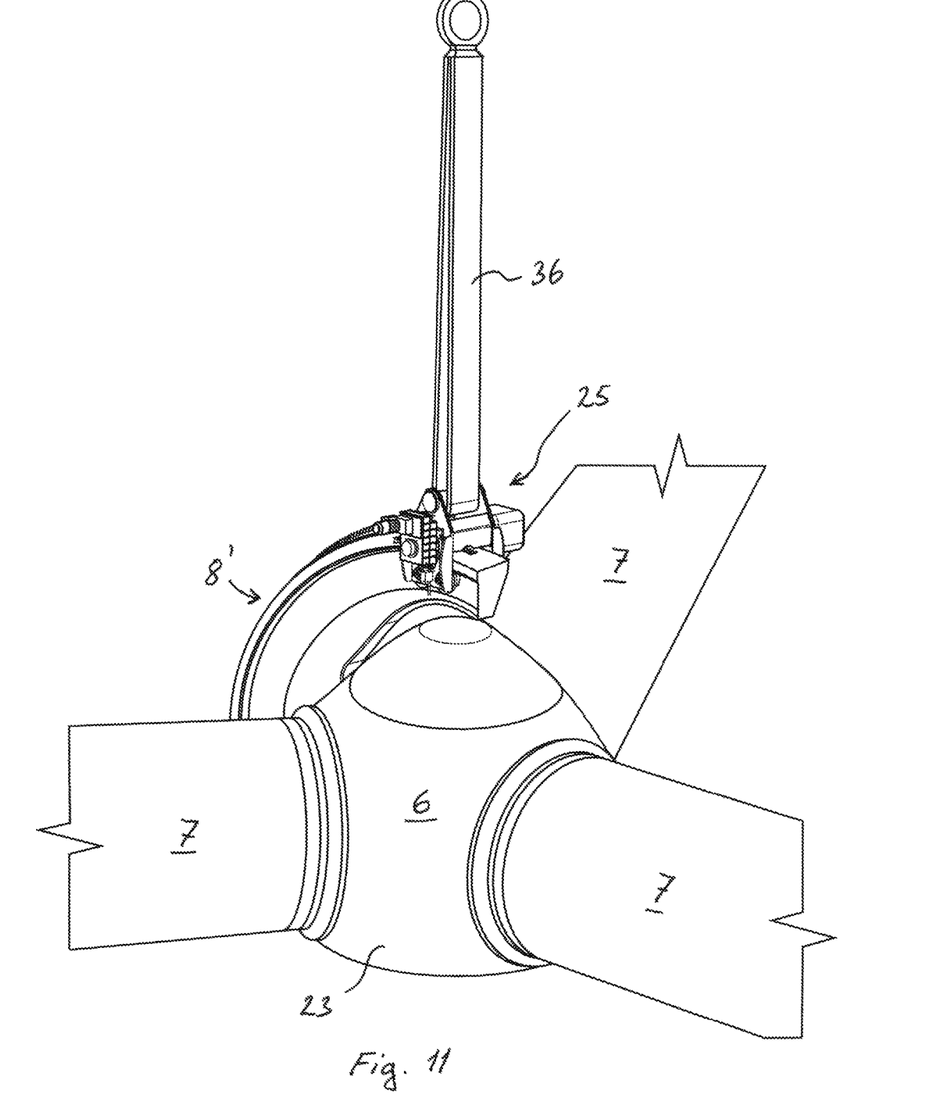
FIG. 11 shows the lifting device of FIG. 8 mounted to a rotor in a lifting position.

FIG. 11 shows the lifting device 8' mounted to a rotor 5 with the trolley assembly 25 placed in a lifting position. The lifting device 8' is mounted to the rotor 5 after it has been pre-assembled at the installation site. The trolley assembly 25 is moved into the lifting position and the crane wire is connected to the lifting element 20', optionally a lifting strap 36 is arranged between the crane wire and the lifting element 20'. The rotor 5 is optionally balanced before it is lifted into the first suspended position.

Figure 12:
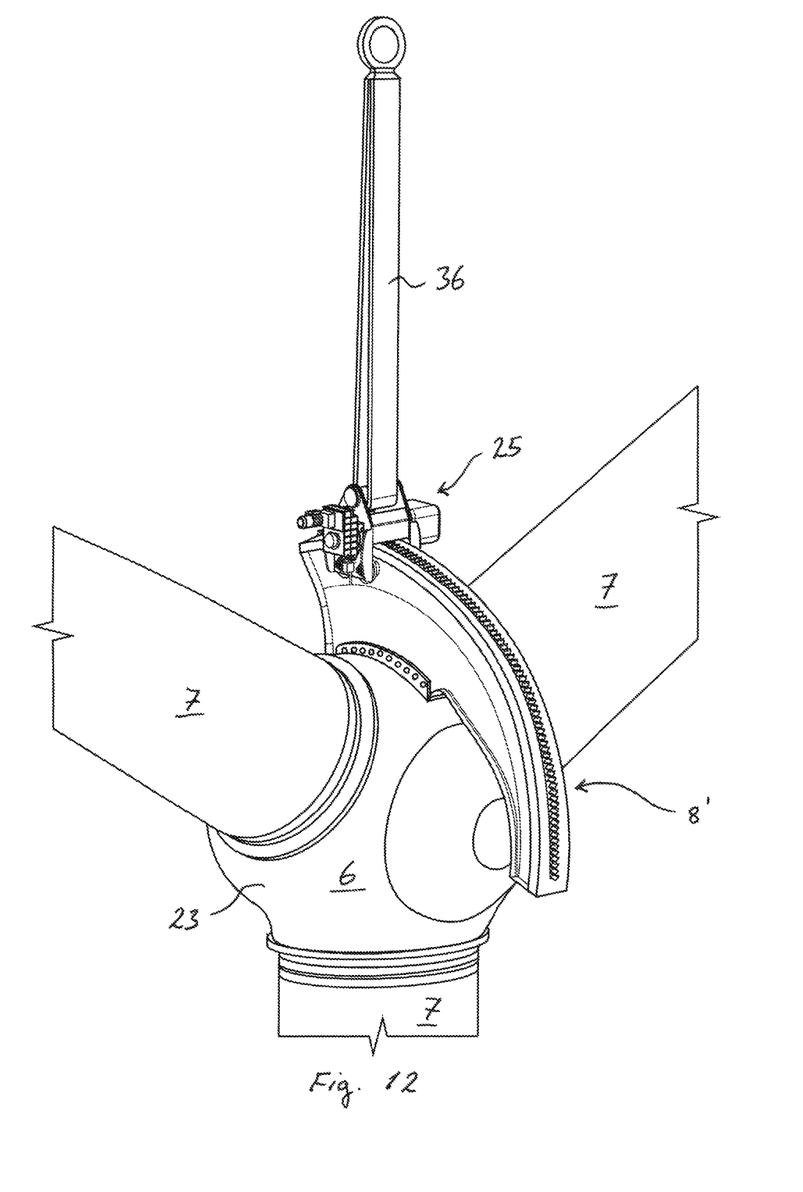
FIG. 12 shows the lifting device and rotor of FIG. 11 in a turned position.

FIG. 12 shows the lifting device 8' in a turned position where the trolley assembly 25 is activated and moved along the track. In this configuration, the movement of the trolley assembly 25 along the track causes the rotor 5 to turn 22 into its installation position. After the turning step is complete, the rotor 5 is lifted further into the second suspended position, and the first mounting interface 11 is mounted to the matching mounting interface of the nacelle 4. The rotor 5 can be stopped in any intermediate position along the track, if needed, allowing the workers to adjust the position of the rotor 5 relative to the ground or the wind turbine tower 2 during the lifting or turning process. The lifting device 8' is finally demounted and the remaining parts of the cover 23 are mounted.

The invention is not limited to the embodiments described herein, and may be modified or adapted without departing from the scope of the present invention as described in the patent claims below.

The invention claimed is:

1. A lifting device for lifting a rotor of a wind turbine, where the lifting device comprises:
    at least one base unit having one or more mounting means configured for mounting to matching mounting means located on an outer surface of a hub of the rotor, the hub further having at least two mounting interfaces configured for mounting to at least two wind turbine blades;
    at least one turning unit comprising a trolley assembly configured to move along a track located on the base unit, wherein a gear coupling is arranged on the trolley assembly and configured to move the trolley assembly along the track so that the rotor is turned in an angle of substantially 90 degrees from a lifting position into an installation position;
    at least one lifting element located on the trolley assembly configured to be connected to an external lifting unit;
    a control unit configured to control the operation of the lifting device, a drive train comprising the gear coupling having a pinion gear engaging a matching gear rim located on the track wherein the pinion gear is connected to a motor driven by a power unit, wherein the turning unit comprises a braking mechanism configured to stop the rotor in any intermediate position between the lifting position and the installation position, wherein the braking mechanism is chosen between an electrical, hydraulic, pneumatic, or electromagnetic brake and said braking mechanism is arranged relative to the drive train for applying a braking force to the trolley assembly, wherein the braking mechanism locks the trolley assembly and thus the rotor in any position along the track when activated, and wherein said braking mechanism is released when the control unit is activated.

2. A lifting device according to claim 1, wherein the lifting device comprises the power unit.

3. A lifting device according to claim 2, wherein the power unit is rotatably connected to the base unit via the gear coupling, wherein the gear coupling is configured to maintain the power unit in substantially the same orientation during the rotation of the rotor.

4. A lifting device according to claim 2, wherein the power unit is a power pack unit configured to power the turning unit, the power unit being controlled by the control unit.

5. A lifting device according to claim 1, wherein the track has one or more track sections, wherein the shape of the one or more track sections is selected from: an involute, a circle, a straight line, a parabola, or an ellipse.

6. A lifting device according to claim 5, wherein the gear rim is arranged symmetrically on the track, wherein the power unit is connected to the motor configured to drive the pinion gear engaging the gear rim.

7. A lifting device according to claim 1, wherein the control unit is connected to the lifting device via a wireless connection, wherein the control unit is configured to remotely control the operation of the lifting device.

8. A lifting device according to claim 1, wherein the lifting element is aligned with a centre of gravity of the rotor and/or the lifting device comprises means for adjusting the balance between the lifting device and the rotor.

9. A method for lifting a rotor of a wind turbine, the rotor having a hub with at least two mounting interfaces for mounting at least two wind turbine blades, where the method comprises the steps of:

mounting at least a part of a wind turbine blade to each of the respective mounting interfaces provided in a hub of the rotor;

mounting a lifting device according to claim 1 to an outer surface of the hub;

connecting an external lifting unit to a turning unit of the lifting device and lifting the rotor into a first suspended position;

turning the rotor in an angle of substantially 90 degrees from its lifting position into an installation position by moving a trolley assembly along a track located on a base unit of the turning unit; and further lifting the rotor into a second suspended position relative to a mounting interface of a nacelle of a wind turbine wherein the method further comprises the step of applying a braking force to the trolley assembly for positioning the rotor in any intermediate position between the lifting position and the installation position.

10. A method according to claim 9, wherein the lifting device locks the rotor in its current position when activation of the control unit is stopped and unlocks the rotor when the control unit is activated.

11. A method according to claim 9, wherein the step of lifting the rotor into the first suspended position comprises balancing the rotor during the lift.

* * * * *